US006560307B2

United States Patent
Marume

(10) Patent No.: US 6,560,307 B2
(45) Date of Patent: *May 6, 2003

(54) X-RAY CT APPARATUS

(75) Inventor: Takashi Marume, Otsu (JP)

(73) Assignee: Shimadzu Corporation, Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/362,571

(22) Filed: Jul. 28, 1999

(65) Prior Publication Data

US 2002/0057756 A1 May 16, 2002

(30) Foreign Application Priority Data

Aug. 6, 1998 (JP) .............................................. 10-222598

(51) Int. Cl.7 ............................................. G01N 23/00
(52) U.S. Cl. .......................................................... 378/4
(58) Field of Search .................................... 378/4–20

(56) References Cited

U.S. PATENT DOCUMENTS 5,594,772 A * 1/1997 Toki et al. ..................... 378/20

FOREIGN PATENT DOCUMENTS

| JP | 04-303431 | 10/1992 |
| JP | 07-323027 | 12/1995 |
| JP | 08-271440 | 10/1996 |

* cited by examiner

Primary Examiner—Craig E. Church
(74) Attorney, Agent, or Firm—Rader Fishman & Grauer

(57) ABSTRACT

A memory includes a collected projection data storage area having, set thereto, a ring buffer area with a storage capacity for storing projection data for angles necessary to reconstruct at least one image, and a normal buffer area with a storage capacity for storing projection data for angles necessary to reconstruct numerous images. When projection data collected by a scanner need not be saved for later use, the projection data is stored and updated in the ring buffer area. Each time projection data for one image has been stored, the image is reconstructed and displayed on an image display. Projection data which should be saved is stored successively, without rewriting, in the normal buffer area. Each time projection data for one image has been stored, the image is reconstructed and displayed on the image display.

18 Claims, 8 Drawing Sheets

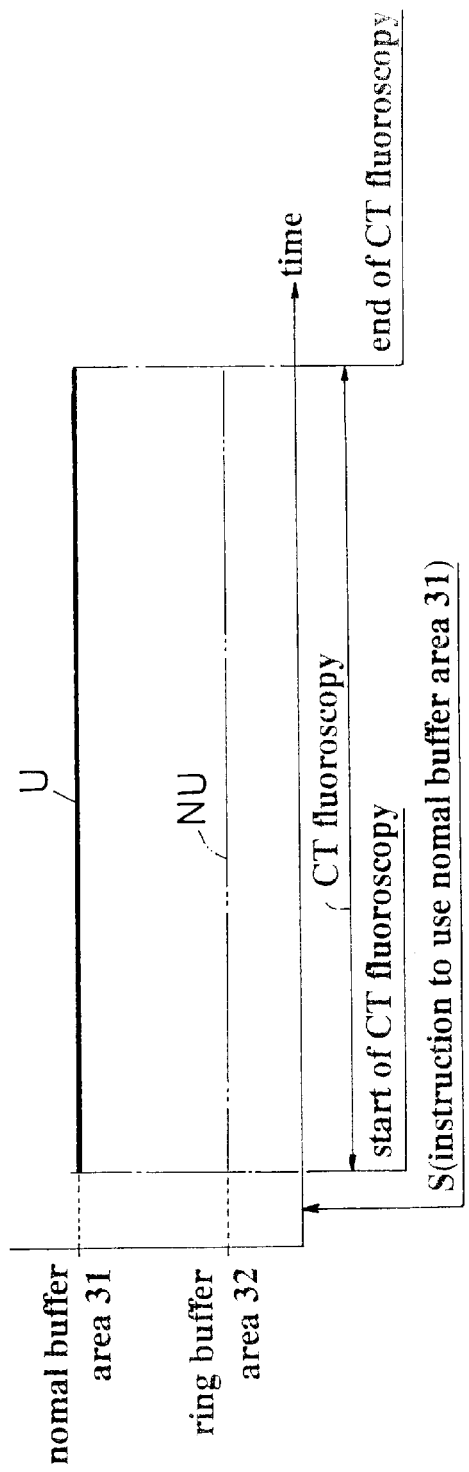
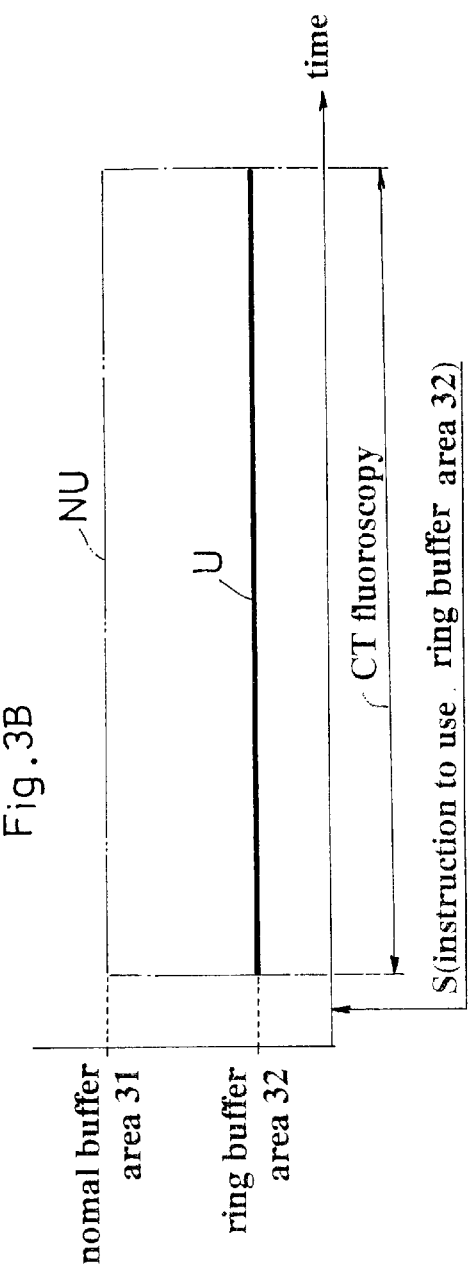

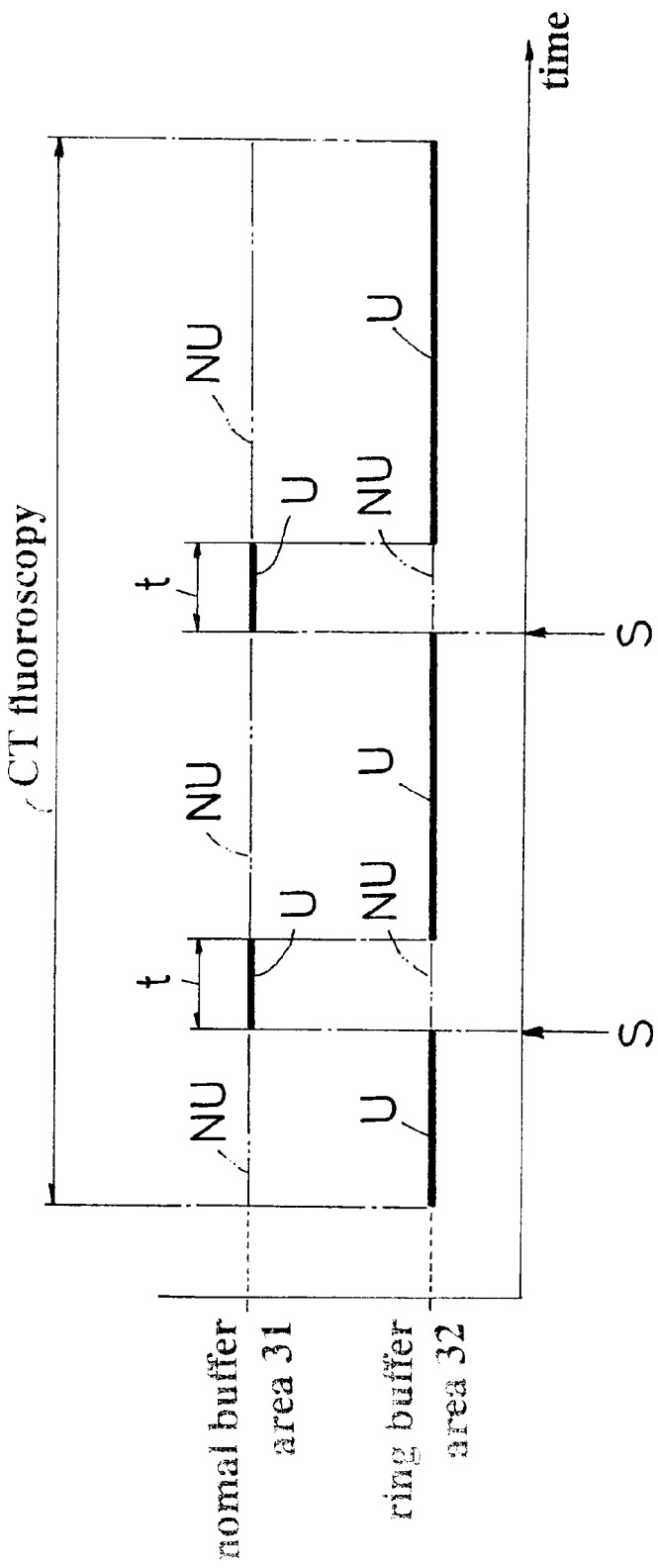

X-RAY CT APPARATUS

BACKGROUND OF THE INVENTION (1) Field of the Invention

This invention relates to X-ray CT apparatus for enabling what is known as CT fluoroscopy.

(2) Description of the Related Art

With an X-ray CT apparatus of this type, an image reconstructing process can be carried out in a shorter time than an image reconstruction performed at a so-called off time. By using the image reconstructing process carried out in such a short time, numerous X-ray CT images may be picked up successively in real time and at a relatively fast rate such as 8 frames per second, for example. Thus, what is known as CT fluoroscopy is performed for observing X-ray CT images, which are sectional images, in the form of continuous dynamic images as in usual X-ray fluoroscopy. CT fluoroscopy, as it enables a real-time observation of continuous images, is used mainly in catheterization such as biopsy. Biopsy and the like usually take a relatively long time, i.e. from several tens of seconds to several minutes.

However, CT fluoroscopy cannot be performed continuously for a long time with a conventional X-ray CT apparatus capable of CT fluoroscopy. That is, with the conventional apparatus, while successively storing in memory all projection data acquired from CT fluoroscopy, an image is reconstructed each time projection data for predetermined angles enabling an image reconstruction has been collected, and such images are displayed successively. Thus, the time for continuously performing CT fluoroscopy is always limited by a storage capacity of memory for storing the projection data.

In time of CT fluoroscopy, numerous images are observed continuously. In practice, it often is the case that only several of those images are useful. In such a case, even though all the projection data collected are stored as with the conventional apparatus, only a small part of the data is reused (e.g. for reconstructing and observing images after CT fluoroscopy). This amounts to a wasteful consumption of memory.

SUMMARY OF THE INVENTION

This invention has been made having regard to the state of the art noted above, and its object is to provide an X-ray CT apparatus which uses memory efficiently to enable CT fluoroscopy to be performed continuously over an extended time, and allows projection data to be saved as necessary.

The above object is fulfilled, according to this invention, by an X-ray CT apparatus for enabling CT fluoroscopy comprising:

a scanning device including an X-ray tube and an X-ray detector for continuously repeating an X-ray scan to collect X-ray projection data from directions of varied angles;

a first storage having a storage capacity for storing projection data for angles necessary to reconstruct at least one image, the first storage storing, after the projection data for the angles is written therein, new projection data as written over the projection data written earliest;

a second storage having a storage capacity for storing projection data for angles necessary to reconstruct numerous images, the second storage successively storing projection data successively collected, without rewriting the projection data, until the storage capacity is exhausted;

an image reconstructing device for reconstructing an image from projection data for predetermined angles;

a control device for controlling storage of the projection data successively collected in a selected one of the first and second storages and transmission of the projection data to the image reconstructing device; and a display device for displaying the image reconstructed by the image reconstructing device.

According to this invention, when a control is effected to store projection data successively collected in the first storage, the first storage stores the latest projection data for angles necessary to reconstruct at least one image. CT fluoroscopy may be performed by reconstructing images from this data at high speed, and displaying the latest X-ray CT images thereby successively acquired on the display device. In this case, since the first storage is constantly updated with a predetermined amount of latest projection data, CT fluoroscopy may be performed continuously over an extended time without a limitation by the storage capacity.

When a control is effected to store projection data successively collected in the second storage, the second storage, as does a storage in a conventional X-ray CT apparatus, successively stores, in the order of collection, the projection data successively collected until the second storage becomes full. The data collection therefore is limited by its capacity, but the data may be read again for image reconstruction to enable observation of selected images.

Thus, according to this invention, CT fluoroscopy may be performed continuously without a limitation of time, or, though limited in time, the projection data acquired for CT fluoroscopy may be saved for use in reproducing, with high image quality afterward, the images seen in time of CT fluoroscopy.

The above X-ray CT apparatus may further comprise a selection instructing device for instructing a selection of one of the first and second storages for storing the projection data collected, and transmission of the projection data to the image reconstructing device. The control device may perform controls, on instructions from the selection instructing device, to determine which of the first and second storages should be used for storing the projection data, and whether the projection data should be transmitted to the image reconstructing device.

This construction allows the operator to select and instruct which of the first and second storages the projection data should be stored in.

In the above X-ray CT apparatus, the control device may perform CT fluoroscopy by determining beforehand which of the first and second storages should be used for storing the projection data collected during the CT fluoroscopy. This selection may be instructed from the selection instructing device.

With this construction, a procedure of CT fluoroscopy not requiring the projection data to be saved may be carried out continuously without a limitation of time while storing and updating projection data only in the first storage. On the other hand, in a procedure of CT fluoroscopy requiring all the projection data to be saved, the projection data is successively stored, without overwriting, only in the second storage, thereby saving all the projection data collected in time of CT fluoroscopy, to enable a subsequent reproduction, with high image quality, of the images observed in time of CT fluoroscopy.

In the above X-ray CT apparatus, the control device may perform CT fluoroscopy while switching between the first and second storages for storing the projection data collected during the CT fluoroscopy.

With this construction, during CT fluoroscopy, projection data not to be saved may be stored in the first storage, while only projection data to be saved may be stored in the second storage. Thus, a continuous procedure of CT fluoroscopy may be performed for an extended time. In addition, among the projection data collected during one cycle of CT fluoroscopy, only necessary data may be saved for later use. In this way, the memory may be used efficiently.

In the above X-ray CT apparatus, the selection instructing device may be operable to instruct, during CT fluoroscopy, switching between the first and second storages for storing the projection data collected during the CT fluoroscopy. This switching of the storages may be effected as follows.

The control device is operable to store the projection data collected during CT fluoroscopy normally in the first storage, to switch storage of the projection data from the first storage to the second storage when an instruction is given from the selection instructing device to select the second storage for storing the projection data, and to switch storage of the projection data from the second storage to the first storage upon lapse of a predetermined time from the instruction.

With this construction, the operator may input a storage switching instruction at a point of time when it becomes necessary to save the projection data during CT fluoroscopy. Then, the projection data collected over a fixed period from the selected point of time may be saved for later use.

The control device may be operable to switch storage of the projection data always upon selecting instructions from the selection instructing device. That is, the control device relies solely on selecting instructions from the selection instructing device for switching from the first storage to the second storage and vice versa for storing the projection data during CT fluoroscopy.

With this construction, the operator may input, at a point of time when it becomes necessary to save projection data during CT fluoroscopy, an instruction to switch from the first storage to the second storage. When it is no longer necessary to save the projection data, the operator may input an instruction to switch from the second storage to the first storage. Thus, the projection data collected over a period between points of time selected by the operator may be saved for later use.

The above X-ray CT apparatus may further comprise a copying device for copying projection data from the first storage to the second storage.

It will serve the purpose as long as the projection data to be copied includes the latest projection data for angles necessary to reconstruct at least one image. Thus, the projection data to be copied may be all the projection data currently stored in the first storage, or only the latest projection data for angles necessary to reconstruct one image.

The copying device may be operable, when X-ray radiation from the X-ray tube is discontinued, with projection data collected before discontinuation of the X-ray radiation being stored in the first storage, to copy the projection data from the first storage to the second storage.

A procedure of CT fluoroscopy could be suspended by temporarily stopping the X-ray radiation from the X-ray tube. With the above construction, even if the projection data collected before the suspension is stored in the first storage, the projection data may be copied automatically to the second storage to be saved for use in reconstructing an image acquired immediately before the suspension.

The X-ray CT apparatus having the copying device may further comprise a copy instructing device for instructing copying of the projection data, the copying device being operable, upon an instruction from the copy instructing device, to copy the projection data from the first storage to the second storage.

With this construction, when the operator decides to save the projection data, though stored in the first storage, the projection data may be copied to the second storage to be saved for later use.

The copying device may be operable to copy the projection data from the first storage to the second storage whenever the control device switches storage of the projection data from the first storage to the second storage during CT fluoroscopy.

Where, for example, a data storage switching is made from the first storage to the second storage upon an instruction from the selection instructing device, the operator gives this switching instruction while observing an image displayed on the display device. It is the first storage that stores the projection data determined by the operator to be necessary for reconstructing the image then displayed on the display device. Thus, the projection data could be lost. With the above construction, however, the projection data stored in the first storage is copied to the second storage also to be saved therein, immediately before the control device switches from the first storage to the second storage for storing the projection data during CT fluoroscopy.

The first and second storages may have separate areas in a memory allocated thereto for storing the projection data.

This feature simplifies controls for storing projection data in the memory.

The first and second storages may have areas in a memory successively allocated thereto for storing the projection data whenever storage of the projection data is switched between the first and second storages, such that new areas are allocated to the first and second storages without overlapping an area already allocated to the second storage.

With this construction, projection data may be stored continually in the memory while saving at least the projection data stored in the second storage set to the memory.

In the above construction, a new area may be allocated to the second storage when storage of the projection data is switched from the first storage to the second storage, without overlapping an area allocated to the first storage before storage of the projection data is switched.

This construction allows saving of also the latest projection data stored in the portions of the memory allocated to the first storage. When it is desired to save the latest projection data stored in the first storage, the projection data need not be copied from the first storage to the second storage.

In the above construction, a new area may be allocated to the second storage when storage of the projection data is switched from the first storage to the second storage, to overlap an area allocated to the first storage before storage of the projection data is switched.

With this construction, the portions of the memory used as the first storage may be allocated efficiently to the second storage. Thus, an efficient use is made of the memory providing the first and second storages.

In the above construction, a new area may be allocated to the second storage when storage of the projection data is switched from the first storage to the second storage, with a selection made whether the new area should overlap or should be separate from an area allocated to the first storage before storage of the projection data is switched.

This construction allows the latest projection data stored in the portions of memory allocated to the first storage to be saved or discarded as desired. Thus, only necessary projection data may be saved while making efficient use of the memory providing the first and second storages.

In the above X-ray CT apparatus, images may be reconstructed from the projection data stored in the second storage and displayed on the display device after CT fluoroscopy.

With this construction, high quality images reconstructed from the projection data stored in the second storage may be confirmed on the display device immediately after CT fluoroscopy.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

FIGS. 3A and 3B are views showing one example of switching of projection data storage areas;

FIG. 4 is a view showing another example of switching of projection data storage areas;

DESCRIPTION OF THE PREFERRED EMBODIMENTS

Preferred embodiments of the present invention will be described in detail hereinafter with reference to the drawings.

Figure 1:
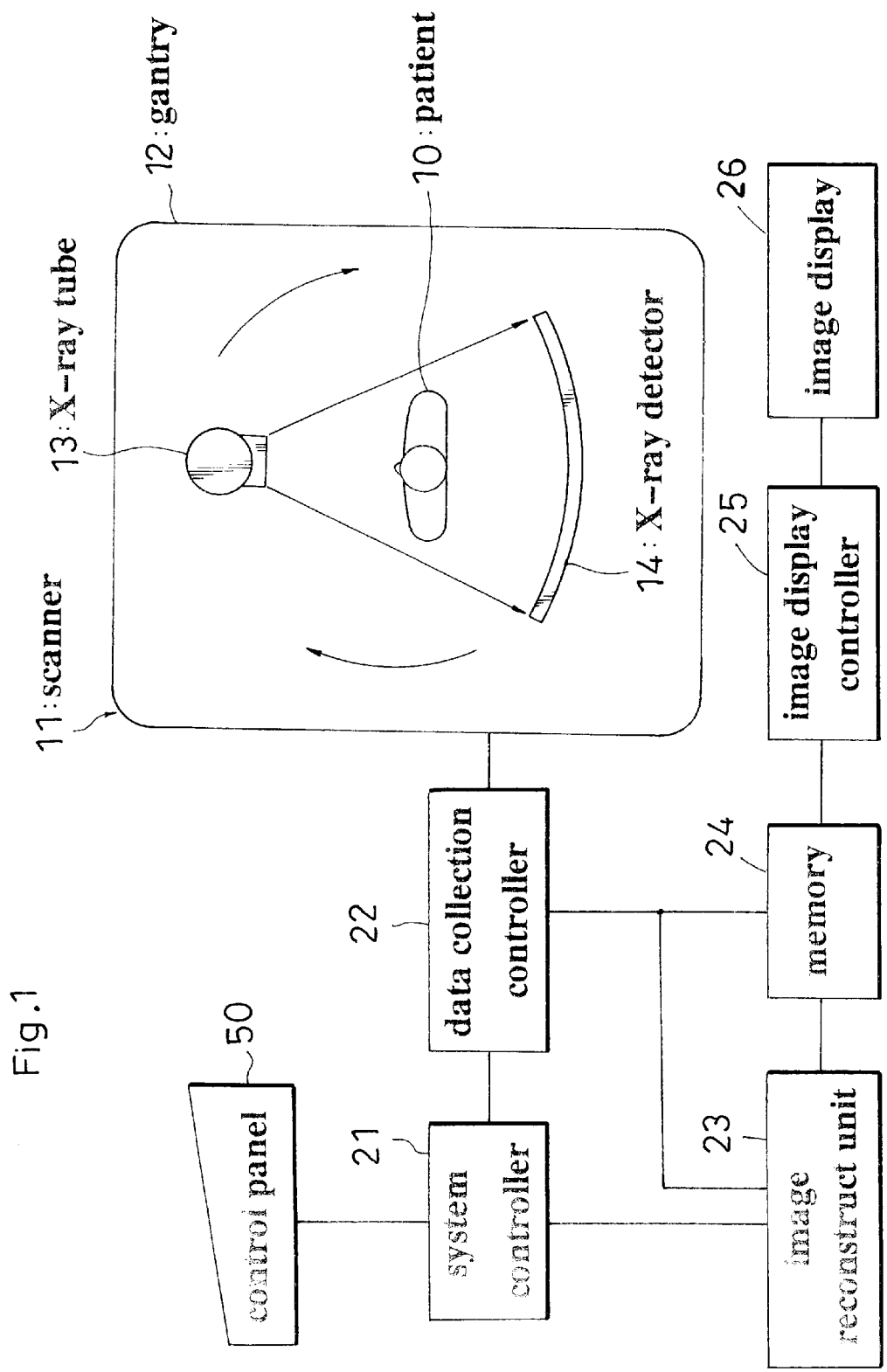
FIG. 1 is a block diagram showing an outline of an X-ray CT apparatus in one embodiment of this invention.

Referring to FIG. 1, a system controller 21 controls an entire apparatus including a data collection controller 22 corresponding to the control device, a memory 24, and an image reconstruct unit 23 corresponding to the image reconstructing device. The data collection controller 22 controls a scanner 11 corresponding to the scanning device, to collect projection data from directions of varied rotating angles about a patient 10 and transmit the collected data to the memory 24 to be stored therein.

The scanner 11 includes a gantry 12 having an X-ray tube 13 and an X-ray detector 14 opposed to each other therein. The X-ray tube 13 and X-ray detector 14 are rotatable together about the patient 10 inserted therebetween, by a rotating mechanism, not shown, mounted in the gantry 12. With the X-ray tube 13 and X-ray detector 14 rotated continuously, X rays are projected through the patient 10 at each rotating angle. Data of X rays transmitted through the patient 10 and detected by the X-ray detector 14 is collected as projection data by the data collection controller 22.

Figure 2:
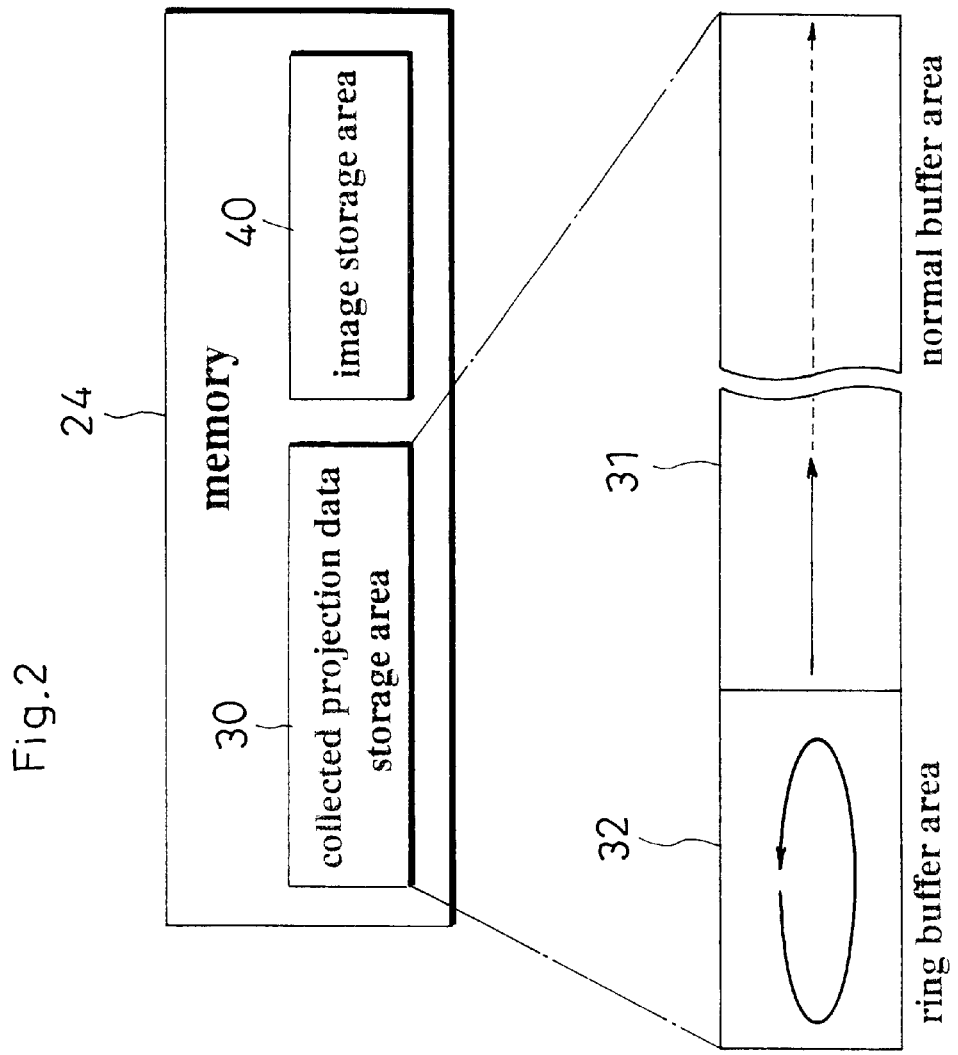
FIG. 2 is a view showing a construction of memory in the embodiment and one example of collected projection data storage area.

As shown in FIG. 2, the memory 24 includes a collected projection data storage area 30 for storing the projection data collected successively, and an image storage area 40 for storing images reconstructed by the image reconstruct unit 23. The projection data storage area 30 is divided into a normal buffer area 31 corresponding to the second storage and a ring buffer area 32 corresponding to the first storage.

The normal buffer area 31 has a relatively large storage capacity for successively storing projection data collected, without renewing the data, until the storage capacity is exhausted. The ring buffer area 32 has a storage capacity for storing projection data taken from angles necessary to reconstruct at least one image. In the ring buffer area 32, as in a so-called ring memory, when new projection data is collected after projection data for respective angles have been recorded, the data recorded earliest is overwritten and replaced by the newly collected data. In FIG. 2, the normal buffer ring area 31 (the second storage) and ring buffer area 32 (the first storage) have, allocated thereto, separate individual areas in the memory 24.

A control as to whether collected projection data should be stored in the normal buffer area 31 or ring buffer area 32 is executed by the data collection controller 22 in response to a selection whether to save the projection data or not.

This selection may be made by the operator, for example, through a control panel 50 corresponding to the selection instructing device.

When the operator instructs, through the control panel 50, a procedure of CT fluoroscopy to be performed without saving projection data (which is called a fluoroscopic mode), projection data collected is successively stored in the ring buffer area 32. At this time, the ring buffer area 32 constantly stores the latest projection data for angles necessary to reconstruct at least one image.

The X-ray tube 13 and X-ray detector 14 in the scanner 11 are rotated continuously to collect projection data for the angles corresponding to each image. The projection data for these angles is transmitted from the memory 24 to the image reconstruct unit 23 to execute an image reconstructing process at high speed. An image reconstructed is stored in the image storage area 40 of memory 24, and is forwarded immediately to an image display controller 25 to be displayed on an image display (image monitor) 26 corresponding to the display device. In this way, CT images acquired may be displayed successively in real time to realize what is known as CT fluoroscopy. In this fluoroscopic mode, the ring buffer area 32 of memory 24 is constantly updated with new projection data. Although projection data cannot be saved for later use, CT fluoroscopy may be performed without limitation to the storage capacity of memory and without a limitation of time.

The storage capacity of the ring buffer area 32 may be determined as appropriate according to a relationship between data collecting speed and image reconstructing speed, for example, as long as the capacity is large enough to store an amount of projection data necessary to reconstruct at least one image. That is, while the image reconstruct unit 23 reads and processes projection data corresponding to one image, the projection data collected are written in the ring buffer area 32. It is thus adequate if projection data for a next image may be read upon completion of the current image reconstructing process.

On the other hand, when an instruction is given to perform CT fluoroscopy while saving projection data (which is called a recording mode), projection data collected is successively stored in the normal buffer area 31. Even when the normal buffer area 31 is filled to its storage capacity, the writing operation is terminated instead of renewing old data. Thus, the projection data stored is saved until a later time. On the other hand, each time projection data for one image is stored in the normal buffer area 31, the projection data is read from the normal buffer area 31, and transmitted to the image reconstruct unit 23 to perform an image reconstructing process at high speed. An image reconstructed is once stored in the image storage area 40 of memory 24, and is forwarded immediately through the image display controller 25 to the image display 26 to be displayed thereon.

In the recording mode, the time for performing CT fluoroscopy is limited by the storage capacity of normal buffer area 31. However, since the projection data is saved, the data may be read to reconstruct images afterward. In this way, images observed in time of CT fluoroscopy may be observed all over again. Besides, for an off-time image observation, images may be reconstructed and displayed with enhanced image quality. That is, in real-time CT fluoroscopy, as in the fluoroscopic mode, the number of projection data used for reconstruction is reduced in order to perform the image reconstructing process quickly to maintain the real-time response, and hence a low image quality. There occurs no such limitation when reconstructing images at off time. An image may be reconstructed from a maximum number of projection data to display the image with high resolution.

The projection data stored in the normal buffer area 31 is saved by the system controller 21 in an external storage such as a magnetic disk not shown. The projection data may be saved in the external storage in parallel with CT fluoroscopy, or may be saved en bloc after CT fluoroscopy. The above image reconstruction in off time is performed by reading the projection data from the external storage (i.e. the projection data stored in the normal buffer area 31 in time of CT fluoroscopy).

The beginning and end of one CT fluoroscopic procedure may be instructed by the operator through the control panel 50, for example. That is, when an instruction is given from the control panel 50 to start CT fluoroscopy, an X-ray scan is started at the scanner 11. Projection data is collected and stored in the memory 24, an image is reconstructed at high speed, and the reconstructed image is displayed. When an instruction is given from the control panel 50 to terminate CT fluoroscopy, the X-ray scan is stopped at the scanner 11. The collection of projection data, storing of the collected projection data in the memory 24, high-speed image reconstruction and display of the reconstructed image are all stopped.

During CT fluoroscopy, X-ray radiation from the X-ray tube 13 may be discontinued temporarily, for example, upon instruction of the operator given through the control panel 50 to suspend the CT fluoroscopy. When the CT fluoroscopy is suspended, a reconstructed image displayed before the suspension remains as it is on the image display 26.

Switching between the normal buffer area 31 and ring buffer area 32 for storing projection data collected during CT fluoroscopy may be effected by a construction described hereinafter.

First, as shown in FIGS. 3A and 3B, for example, an instruction S is given from the control panel 50 before CT fluoroscopy to select the normal buffer area 31 or ring buffer area 32 for storing projection data collected during the CT fluoroscopy. During the CT fluoroscopy, the data collection controller 22 stores projection data in only one of the buffer areas 31 and 32 selected before the CT fluoroscopy. In FIGS. 3A and 3B, and in FIGS. 4 and 5 described later, the buffer area 31 or 32 used to store the projection data is marked with solid lines U, while the buffer area 32 or 31 not used is marked with two-dot chain lines NU.

With this construction, a procedure of CT fluoroscopy not requiring projection data to be saved may be carried out continuously without a limitation of time while storing and updating projection data only in the ring buffer area 32. On the other hand, in a procedure of CT fluoroscopy requiring all projection data to be saved, projection data is successively stored, without overwriting, only in the normal buffer area 31, thereby saving all projection data collected in time of CT fluoroscopy to enable a subsequent reproduction, with high image quality, of images observed in time of CT fluoroscopy.

Selecting instructions from the control panel 50 may be accepted also during CT fluoroscopy. Then, CT fluoroscopy is performed while the data collection controller 22 switches between the normal buffer area 31 and ring buffer area 32 for storing projection data collected during the CT fluoroscopy.

With this construction, during CT fluoroscopy, projection data not to be saved may be stored in the ring buffer area 32, while only projection data to be saved may be stored in the normal buffer area 31. Thus, a continuous procedure of CT fluoroscopy may be performed for an extended time. In addition, among the projection data collected during one cycle of CT fluoroscopy, only necessary data may be saved for later use. In this way, the memory 24 may be used efficiently.

Where CT fluoroscopy is performed while switching is made on a selecting instruction from the control panel 50 between the normal buffer area 31 and ring buffer area 32 for storing projection data collected during CT fluoroscopy, the switching between the buffer areas may be effected as follows.

As shown in FIG. 4, the data collection controller 22 may normally store the projection data collected during CT fluoroscopy in the ring buffer area 32. When a selecting instruction S is given from by the control panel 50 to store the projection data in the normal buffer area 31, the data collection controller 22 switches from the ring buffer area 32 to the normal buffer area 31 for storing the projection data. Upon lapse of a predetermined time t from the selecting instruction S, switching is made from the normal buffer area 31 to the ring buffer area 32 for storing the projection data.

With this construction, the operator may input a buffer area switching instruction at a point of time when it becomes necessary to save projection data during CT fluoroscopy. Then, the projection data collected over a fixed period from the selected point of time may be saved for later use.

The time t for storing the projection data in the normal buffer area 31 is set, for example, to a time required for storing in the normal buffer area 31 the projection data that should be saved as necessary for reconstructing a predetermined number of images.

Figure 5:
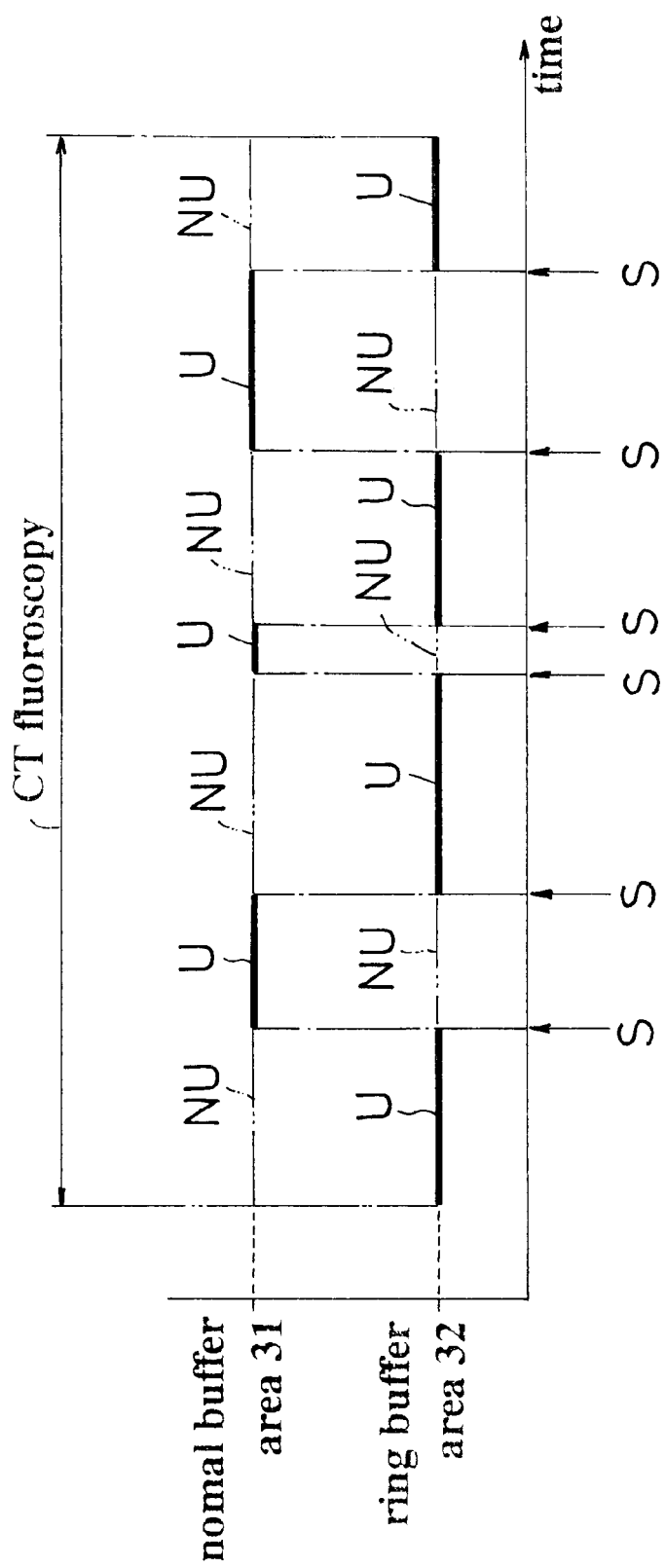
FIG. 5 is a view showing a further example of switching of projection data storage areas.

As shown in FIG. 5, the data collection controller 22 may be constructed to switch the projection data storing buffer areas always in response to selecting instructions S from the control panel 50. That is, the data collection controller 22 relies solely on selecting instructions S from the control panel 50 for switching from the normal buffer area 31 to the ring buffer area 32 and vice versa for storing the projection data during CT fluoroscopy.

With this construction, the operator may input, at a point of time when it becomes necessary to save projection data during CT fluoroscopy, an instruction to switch from the ring buffer area 32 to the normal buffer area 31. When it is no longer necessary to save projection data, the operator may input an instruction to switch from the normal buffer area 31 to the ring buffer area 32. Thus, the projection data collected over a period between points of time selected by the operator may be saved for later use.

Where the projection data storing buffer areas are always switched in response to selecting instructions S from the control panel 50, as shown in FIG. 5, the data collection controller 22 may store the projection data in the ring buffer area 32 whenever CT fluoroscopy is started. Alternatively, based on an instruction given from the control panel 50 before CT fluoroscopy, a selection may be made between the normal buffer area 31 and ring buffer area 32 for storing projection data when CT fluoroscopy is started.

The selecting instruction given from the control panel 50 before CT fluoroscopy is not limited to a special selecting instruction given from the control panel 50 before each procedure of CT fluoroscopy. For example, the last selecting instruction given in a preceding procedure of CT fluoroscopy may be regarded as a selecting instruction given from the control panel 50 before a next procedure of CT fluoroscopy. That is, the last selecting instruction given in the preceding procedure of CT fluoroscopy may be stored in memory for use in determining which of the normal buffer area 31 and ring buffer area 32 should be used to store projection data when the next procedure of CT fluoroscopy is started.

When a special selecting instruction is given from the control panel 50 before a procedure of CT fluoroscopy, this instruction may be referred to for determining which of the normal buffer area 31 and ring buffer area 32 should be used to store projection data at the start of CT fluoroscopy. When no special selecting instruction is given from the control panel 50 before CT fluoroscopy, projection data may stored in the ring buffer area 32 at the start of CT fluoroscopy.

In the above embodiment, the system controller 21 may be operable to copy the projection data stored in the ring buffer area 32 to the normal buffer area 31. In this case, the system controller 21 corresponds to the copying device.

It will serve the purpose as long as the projection data to be copied includes the latest projection data for angles necessary to reconstruct at least one image. Thus, the projection data to be copied may be all the projection data currently stored in the ring buffer area 32, or only the latest projection data for angles necessary to reconstruct one image.

The system controller 21 may copy the projection data also when the X-ray radiation from the X-ray tube 13 in the scanner 11 is stopped (CT fluoroscopy is suspended) as noted above. That is, when the projection data collected before discontinuation of X-ray radiation (suspension of CT fluoroscopy) is stored in the ring buffer area 32, the system controller 21 may copy the projection data from the ring buffer area 32 to the normal buffer area 31.

With this construction, when a procedure of CT fluoroscopy executed is suspended by temporarily stopping the X-ray radiation from the X-ray tube 13, and even if the projection data collected before the suspension is stored in the ring buffer area 32, the projection data may be copied automatically to the normal buffer area 31 to be saved for use in reconstructing an image acquired immediately before the suspension. No copying operation is carried out when the projection data collected before the suspension is stored in the normal buffer area 31.

The system controller 21 may copy projection data, for example, on a data copying instruction given by the operator through the control panel 50. In response to such an instruction, the system controller 21 may copy the projection data stored in the ring buffer area 32 to the normal buffer area 31. In this case, the control panel 50 corresponds to the copy instructing device.

With this construction, when the operator decides to save the projection data, though stored in the ring buffer area 32, the projection data may be copied to the normal buffer area 31 to be saved for later use.

The projection data may be copied to the normal buffer area 31 upon a copying instruction given from the control panel 50 (copy instructing device) also when the X-ray radiation from the X-ray tube 13 in the scanner 11 is stopped (CT fluoroscopy is suspended) as noted above. At this time, an instruction may be given as to whether the projection data should be copied, along with an instruction to stop the X-ray radiation, for example. The projection data may be copied to the normal buffer area 31 upon a copying instruction given after suspension of CT fluoroscopy and before restarting thereof. When CT fluoroscopy is suspended, the projection data may be copied automatically to the normal buffer area 31 once as in the above operation. Subsequently, when a copying instruction is given from the control panel 50 before restarting of CT fluoroscopy, the projection data automatically copied is as it is, whereby the projection data has in substance been copied to the normal buffer area 31. Unless a copying instruction is given from the control panel 50 (or an instruction is given from the control panel 50 not to copy the data) before restarting of CT fluoroscopy, the projection data automatically copied is discarded, whereby the projection data has in substance not been copied to the normal buffer area 31.

The system controller 21 may be operable to copy the projection data stored in the ring buffer area 32 to the normal buffer area 31 whenever the data collection controller 22 switches from the ring buffer area 32 to the normal buffer area 31 for storing the projection data during CT fluoroscopy, That is, where a data storage switching is made from the ring buffer area 32 to the normal buffer area 31 upon an instruction from the control panel 50, the operator gives this switching instruction while observing an image displayed on the image display 26. It is the ring buffer area 32 that stores the projection data determined by the operator to be necessary for reconstructing the image then displayed on the image display 26. Thus, the projection data could be lost. With the above construction, however, the projection data stored in the ring buffer area 32 is copied to the normal buffer area 31 also to be saved therein, immediately before the data collection controller 22 switches from the ring buffer area 32 to the normal buffer area 31 for storing the projection data during CT fluoroscopy.

As described in the above embodiment (FIG. 2), the normal buffer area 31 and ring buffer area 32 are individually set to the memory 24 for storing projection data. This simplifies controls for storing projection data in the memory 24. However, the normal buffer area 31 and ring buffer area 32 are not limited to such arrangement.

As shown in FIGS. 6A through 6D, 7A through 7D and 8A through 8D, for example, normal buffer areas 31 and ring buffer areas 32 may be set successively to the memory 24 for storing projection data each time switching is made between normal buffer area 31 and ring buffer area 32 for storing the projection data. A new normal buffer area 31 or ring buffer area 32 may be set without overlapping a normal buffer area 31 already set to the memory 24.

Figure 6A:
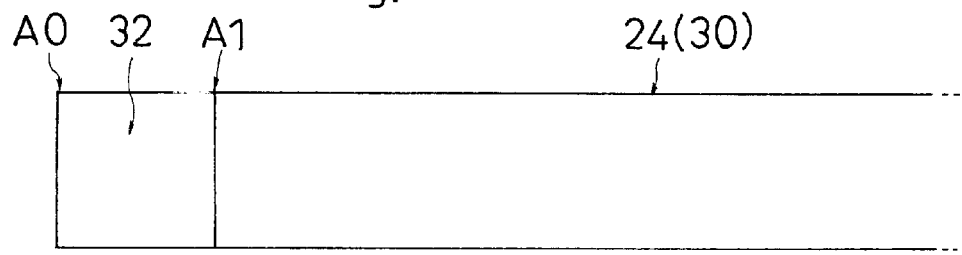
FIGS. 6A through 6D are views showing a modified construction of the collected projection data storage area.
Figure 7A:
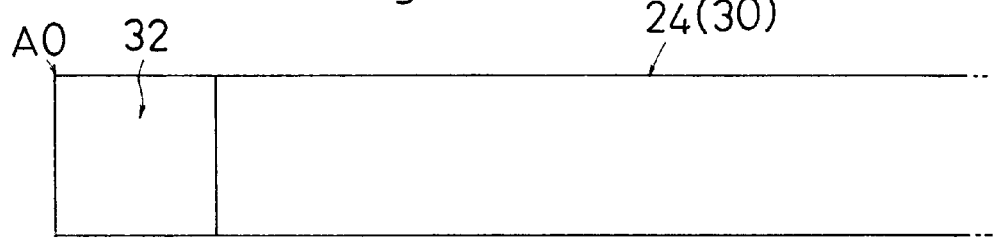
FIGS. 7A through 7D are views showing another modified construction of the collected projection data storage area.
Figure 8A:
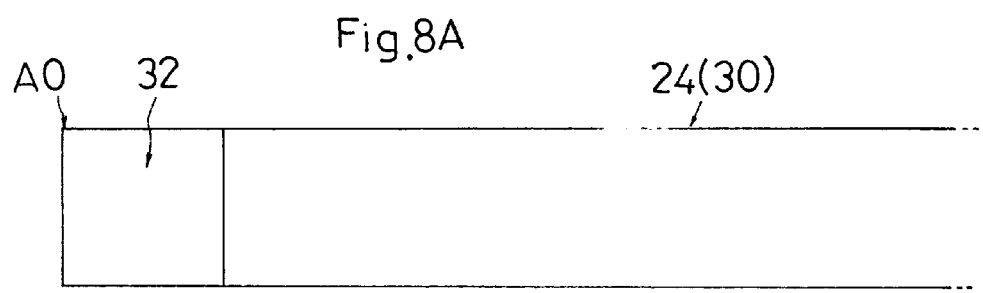
FIGS. 8A through 8D are views showing a further modified construction of the collected projection data storage area.
Figure 8B:
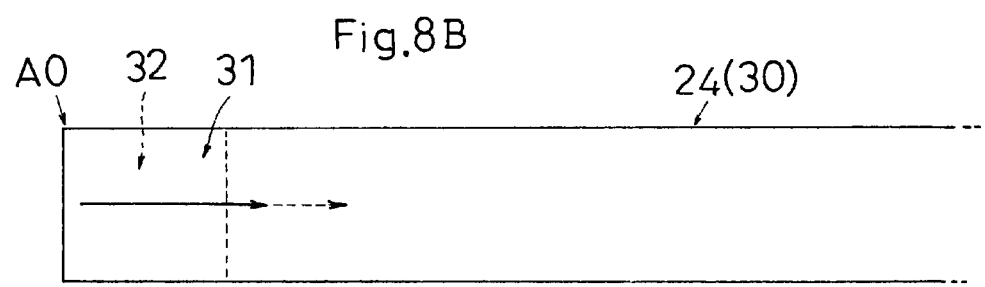
Figure 8C:
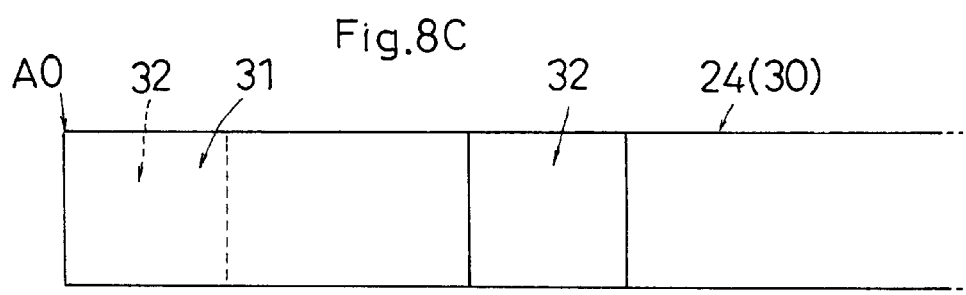
Figure 8D:
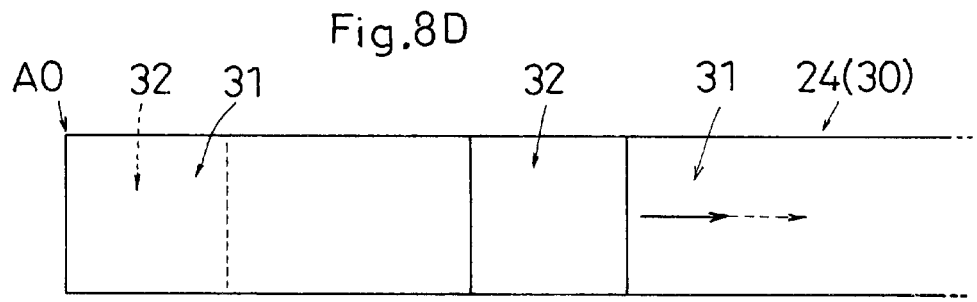

Where, for example, projection data is stored in a ring buffer area 32 at the start of CT fluoroscopy, as shown in FIGS. 6A, 7A and 8A, the ring buffer area 32 is set to a portion starting at first address AO of the collected projection data storage area 30 (see FIG. 2) set to the memory 24. This ring buffer area 32 has the same storage capacity as in the construction shown in FIG. 2. Projection data continues to be stored and updated in this ring buffer area 32 until a switching of projection storage areas is made.

When switching is made from ring buffer area 32 to normal buffer area 31 for storing projection data, a normal buffer area 31 is set to the collected projection data storage area 30 in the memory 24.

Figure 6B:
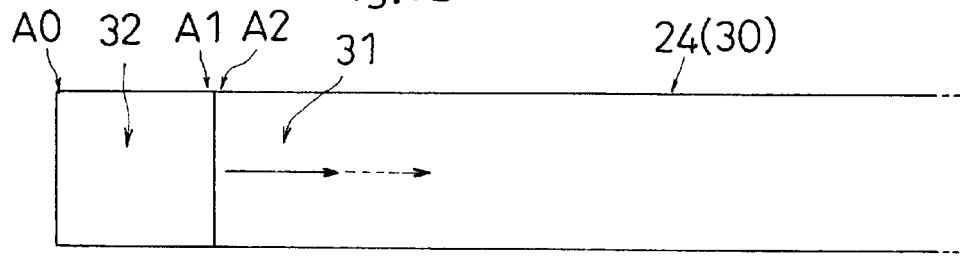
Figure 7B:
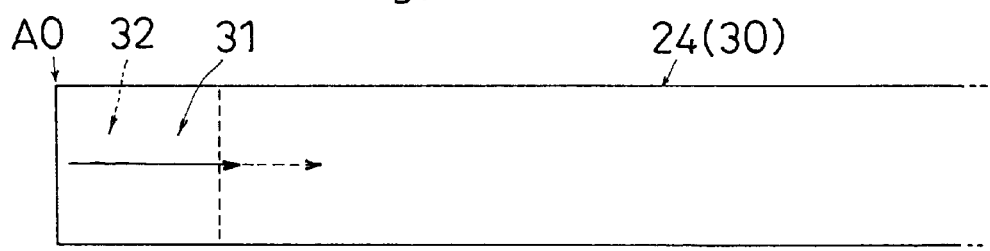

At this time, as shown in FIG. 6B, a portion of memory 24 (collected projection data storage area 30) may be newly allocated to the normal buffer area 31 without overlapping the portion of memory 24 allocated to the ring buffer area 32 before the switching (see FIG. 6A). That is, the normal buffer area 31 may start at address A2 (=A1+1) immediately following the last address A1 in the ring buffer area 32 set in FIG. 6A. Alternatively, as shown in FIG. 7B, the normal buffer area 31 may be set to overlap the portion of memory 24 allocated to the ring buffer area 32 before the switching (see FIG. 7A). That is, the normal buffer area 31 may start at the first address A0 of the ring buffer area 32 set in FIG. 7A. Projection data is successively stored in this normal buffer area 31 (from address A2 in FIG. 6B or from address A0 in FIG. 7B) until the projection data storage is switched.

Next, a further ring buffer area 32 is set to the memory 24 when the projection data storage is switched from normal buffer area 31 to ring buffer area 32.

Figure 6C:
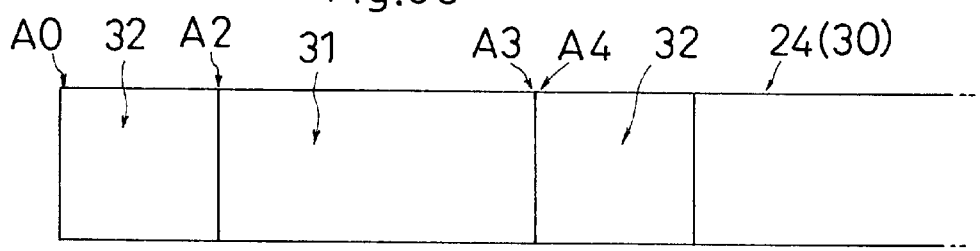
Figure 7C:
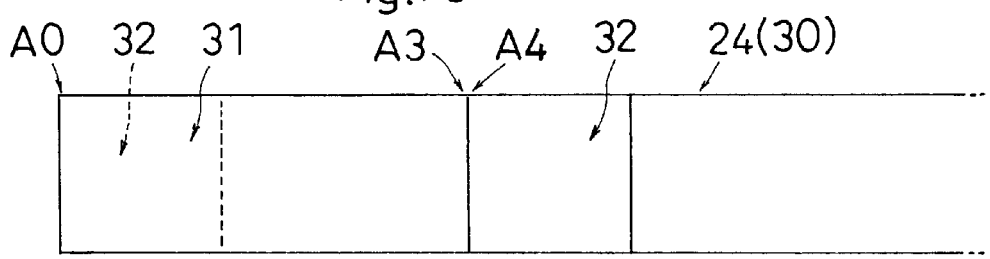

At this time, as shown in FIGS. 6C and 7C, a portion of memory 24 newly allocated to the ring buffer area 32 starts at address A4 (=A3+1) immediately following the address A3 of projection data last stored in the normal buffer area 31 before the switching. Consequently, the projection data stored in the normal buffer area 31 set in FIG. 6B or 7B is not overwritten. The normal buffer area 31 may be set with only a first address determined, such that its storage capacity is variable with a time taken until the projection data storage is switched from normal buffer area 31 to ring buffer area 32 (i.e. with the quantity of projection data collected during this period).

Figure 6D:
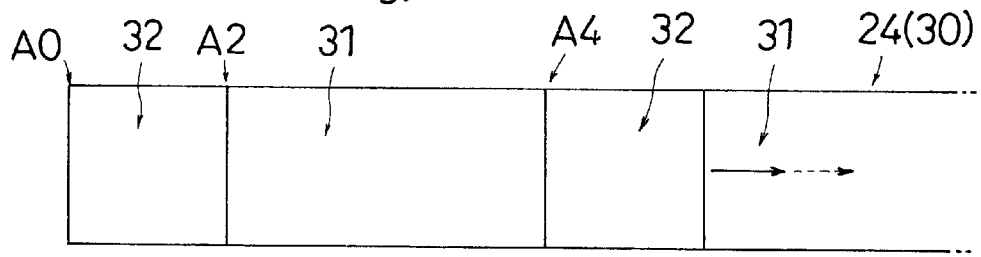
Figure 7D:
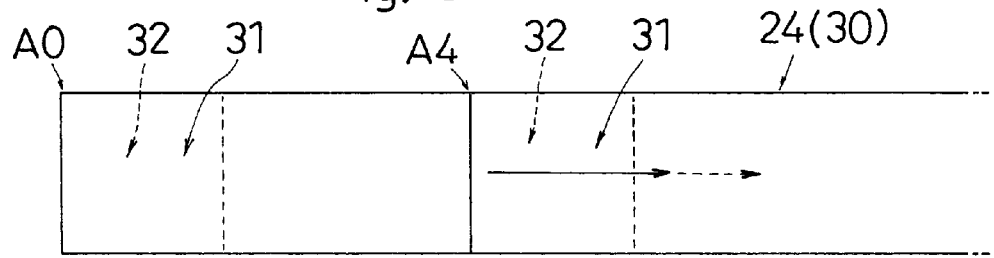

Next, when the projection data storage is switched from ring buffer area 32 to normal buffer area 31, as in FIGS. 6B and 7B, a normal buffer area 31 is set to the memory 24 (see FIGS. 6D and 7D).

Subsequently, as the projection data storage is switched, new buffer areas are successively set to the memory 24 for storing projection data.

In the construction shown in FIGS. 6A through 6D, each new normal buffer area 31 is set to the memory 24 not to overlap the ring buffer area 32 set before the switching. On the other hand, in the construction shown in FIGS. 7A through 7D, each new normal buffer area 31 is set to the memory 24 to overlap the ring buffer area 32 set before the switching. When, for example, the projection data storage is switched from ring buffer area 32 to normal buffer area 31 on an instruction from the control unit 50, a selection may be made as to whether or not a portion of memory 24 allocated to a normal buffer area 31 should overlap a ring buffer area 32 set to the memory 24 before the switching (FIGS. 8A–8D). In FIGS. 6A–6D, 7A–7D and 8A–8D, projection data is stored in a ring buffer area 32 at the start of CT fluoroscopy. Where projection data is stored in a normal buffer area 31 at the start of CT fluoroscopy, the normal buffer area 31 may be set to the portion starting at first address A0 of the collected projection data storage area 30 set to the memory 24. Projection data may be stored successively in this normal buffer area 31 until the projection data storage is switched.

With the constructions shown in FIGS. 6A–6D, 7A–7D and 8A–8D, projection data may be stored continually in the memory 24 while saving at least the projection data stored in the normal buffer areas 31 set to the memory 24.

The construction shown in FIGS. 6A–6D allows saving of also the latest projection data stored in the portions of memory 24 allocated to the ring buffer area 32. When it is desired to save the latest projection data stored in the ring buffer area 32, the projection data need not be copied from the ring buffer area 32 to normal buffer area 31.

With the construction shown in FIGS. 7A–7D, the portions of memory 24 used as ring buffer area 32 may be allocated efficiently to the normal buffer area 31. Thus, an efficient use is made of the memory 24 providing the normal buffer area 31 and ring buffer area 32.

The construction shown in FIGS. 8A–8D allows the latest projection data stored in the portions of memory 24 allocated to the ring buffer area 32 to be saved or discarded as desired. Thus, only necessary projection data may be saved while making efficient use of the memory 24 providing the normal buffer area 31 and ring buffer area 32.

In the foregoing embodiment and modifications thereof, after a procedure of CT fluoroscopy, an image may be reconstructed (with high image quality) from the projection data stored in the normal buffer area 31 for display on the image display 26.

With this construction, the high quality image reconstructed from the projection data stored in the normal buffer area 31 may be confirmed on the image display 26 immediately after the CT fluoroscopy.

In the foregoing embodiment, the areas for storing projection data are switched on a selecting instruction from the control unit 50. This invention is not limited thereto. The projection data storage may be switched by a trigger other than the selecting instruction from the control unit 50. For example, the projection data storage may be switched every predetermined time after a start of CT fluoroscopy. In this way, switching of the projection data storage may be carried out by time management.

The present invention may be embodied in other specific forms without departing from the spirit or essential attributes thereof and, accordingly, reference should be made to the appended claims, rather than to the foregoing specification, as indicating the scope of the invention.

What is claimed is:

1. An X-ray CT apparatus for enabling CT fluoroscopy comprising:

scanning means including an X-ray tube and an X-ray detector for continuously repeating an X-ray scan to collect X-ray projection data from directions of varied angles;

a first storage having a storage capacity for storing projection data for angles necessary to reconstruct at least one image;

a second storage having a storage capacity for storing projection data for angles necessary to reconstruct numerous images;

image reconstructing means for reconstructing an image from projection data for predetermined angles;

control means for controlling storage of the projection data successively collected in a selected one of said first and second storages and transmission of the projection data to said image reconstructing means, that is after writing projection data for angles necessary to reconstruct at least one image into said first storage, a selection is made, during a data collecting operation, between writing new projection data over the projection data written earliest in said first storage, and successively storing projection data successively collected, in said second storage without rewriting the projection data, until the storage capacity of said second storage is exhausted; and display means for displaying the image reconstructed by said image reconstructing means.

2. An X-ray CT apparatus as defined in claim 1, further comprising selection instructing means for instructing a selection of one of said first and second storages for storing the projection data collected, and transmission of the projection data to said image reconstructing means, said control means performing controls based on instructions from said selection instructing means.

3. An X-ray CT apparatus as defined in claim 1, wherein said control means selects, before commencing the CT fluoroscopy, which of said first and second storages should be used for storing the projection data collected during the CT fluoroscopy.

4. An X-ray CT apparatus as defined in claim 1, wherein said control means comprises switching means for switching between said first and second storages for storing the projection data collected during the CT fluoroscopy.

5. An X-ray CT apparatus as defined in claim 2, wherein said selection instructing means is operable to instruct beforehand which of said first and second storages should be used for storing the projection data collected during CT fluoroscopy.

6. An X-ray CT apparatus as defined in claim 2, wherein said selection instructing means is operable to instruct, during CT fluoroscopy, switching between said first and second storages for storing the projection data collected during the CT fluoroscopy.

7. An X-ray CT apparatus as defined in claim 6, wherein said control means is operable to store the projection data collected during the CT fluoroscopy normally in said first storage, to switch storage of the projection data from said first storage to said second storage when an instruction is given from said selection instructing means to select said second storage for storing the projection data, and to switch storage of the projection data from said second storage to said first storage upon lapse of a predetermined time from said instruction.

8. An X-ray CT apparatus as defined in claim 6, wherein said control means is operable to switch storage of the projection data always upon selecting instructions from said selection instructing means.

9. An X-ray CT apparatus as defined in claim 1, further comprising copying means for copying projection data from said first storage to said second storage.

10. An X-ray CT apparatus as defined in claim 9, wherein said copying means is operable, when X-ray radiation from said X-ray tube is discontinued, with projection data collected before discontinuation of the X-ray radiation being stored in said first storage, to copy the projection data from said first storage to said second storage.

11. An X-ray CT apparatus as defined in claim 9, further comprising copy instructing means for instructing copying of the projection data, said copying means being operable, upon an instruction from said copy instructing means, to copy the projection data from said first storage to said second storage.

12. An X-ray CT apparatus as defined in claim 9, wherein said copying means is operable to copy the projection data from said first storage to said second storage whenever said control means switches storage of the projection data from said first storage to said second storage during CT fluoroscopy.

13. An X-ray CT apparatus as defined in claim 1, wherein said first and second storages have separate areas in a memory allocated thereto for storing the projection data.

14. An X-ray CT apparatus as defined in claim 1, wherein said first and second storages each further comprise areas in a memory which are successively allocated for storing the projection data whenever storage of the projection data is switched between said first and second storages, such that new areas are allocated to said first and second storages without overlapping an area already allocated to said second storage.

15. An X-ray CT apparatus as defined in claim 14, wherein a new area is allocated to said second storage when storage of the projection data is switched from said first storage to said second storage, without overlapping an area allocated to said first storage before storage of the projection data is switched.

16. An X-ray CT apparatus as defined in claim 14, wherein a new area is allocated to said second storage when storage of the projection data is switched from said first storage to said second storage, to overlap an area allocated to said first storage before storage of the projection data is switched.

17. An X-ray CT apparatus as defined in claim 14, wherein a new area is allocated to said second storage when storage of the projection data is switched from said first storage to said second storage, with a selection made whether said new area should overlap or should be separate from an area allocated to said first storage before storage of the projection data is switched.

18. An X-ray CT apparatus as defined in claim 1, wherein an image is reconstructed from the projection data stored in said second storage and displayed on said display means after CT fluoroscopy.

* * * * *